US005603520A

United States Patent [19]
Pearce

[11] Patent Number: 5,603,520
[45] Date of Patent: Feb. 18, 1997

[54] LIGHT-WEIGHT WHEEL ASSEMBLY FOR WHEELCHAIRS

[75] Inventor: Tony M. Pearce, Alpine, Utah

[73] Assignee: TekSourc, LC, Sandy, Utah

[21] Appl. No.: 371,701

[22] Filed: Jan. 12, 1995

Related U.S. Application Data

[63] Continuation-in-part of Ser. No. 94,718, Jul. 20, 1993, Pat. No. 5,379,866.

[51] Int. Cl.$^6$ .................................................. B60T 1/06
[52] U.S. Cl. ......................................... 280/250.1; 188/2 F
[58] Field of Search ........................... 280/250.1, 304.1; 188/2 F; 301/55

[56] References Cited

U.S. PATENT DOCUMENTS

| | | | |
|---|---|---|---|
| Re. 32,242 | 9/1986 | Minnebrocker | 280/242 WC |
| D. 306,712 | 3/1990 | Friedrich | D12/128 |
| 2,425,574 | 8/1947 | Stewack | 188/31 |
| 2,824,597 | 2/1958 | Lerman | 155/30 |
| 3,356,185 | 12/1967 | Isaacks | 188/31 |
| 3,618,968 | 9/1971 | Green | 280/36 |
| 3,897,857 | 8/1975 | Rodaway | 188/2 F |
| 3,901,527 | 8/1975 | Danziger et al. | 280/34 R |
| 3,964,286 | 6/1976 | Machuda | 297/330 |
| 4,280,595 | 7/1981 | Timms et al. | 188/31 |
| 4,431,076 | 2/1984 | Simpson | 180/65 R |
| 4,489,955 | 12/1984 | Hamilton | 280/242 |
| 4,500,102 | 2/1985 | Haury et al. | 280/242 |
| 4,501,033 | 2/1985 | Kessel et al. | 5/200 R |
| 4,593,929 | 6/1986 | Williams | 280/690 |
| 4,598,944 | 7/1986 | Meyer | 297/183 |
| 4,652,005 | 3/1987 | Hartwell | 280/242 |
| 4,733,755 | 3/1988 | Manning | 188/31 |
| 4,768,797 | 9/1988 | Friedrich | 280/242 |
| 4,953,913 | 9/1990 | Graebe | 297/459 |
| 4,989,890 | 2/1991 | Lockard | 280/42 |
| 5,028,065 | 7/1991 | Danecker | 280/250.1 |
| 5,060,962 | 10/1991 | McWethy | 280/304.1 |
| 5,074,620 | 12/1991 | Joy et al. | 297/333 |
| 5,120,071 | 6/1992 | Thibault | 280/474 |
| 5,152,543 | 10/1992 | Sims et al. | 280/250.1 |
| 5,176,393 | 1/1993 | Robertson | 280/250 |
| 5,203,433 | 4/1993 | Dugas | 188/31 |
| 5,242,179 | 9/1993 | Beddome et al. | 280/233 |
| 5,249,847 | 10/1993 | Lee | 301/105.1 |
| 5,253,888 | 10/1993 | Friedrich | 280/250.1 |
| 5,379,866 | 1/1995 | Pearce et al. | 188/2 F |

OTHER PUBLICATIONS

Copies of Promotional Materials in parent application Ser. No. 08/094,718, filed Jul. 20, 1993, now U.S. Pat. No. 5,379,866 issued Jan. 10, 1995.

Primary Examiner—Douglas C. Butler
Attorney, Agent, or Firm—Daniel McCarthy; Mark G. Sandbaken

[57] ABSTRACT

A lightweight wheel assembly intended primarily for use on wheelchairs is disclosed and claimed. The assembly includes an injection-moldable fiber-reinforced plastic push rim comprising a variety of fastening devices. Important advantages of the invention include very light weight compared to prior art wheel assemblies while achieving the high component strength desired, shock absorption qualities beneficial to wheelchair users not provided by other wheel assemblies, and components which may be made from the inexpensive injection molding process.

23 Claims, 7 Drawing Sheets

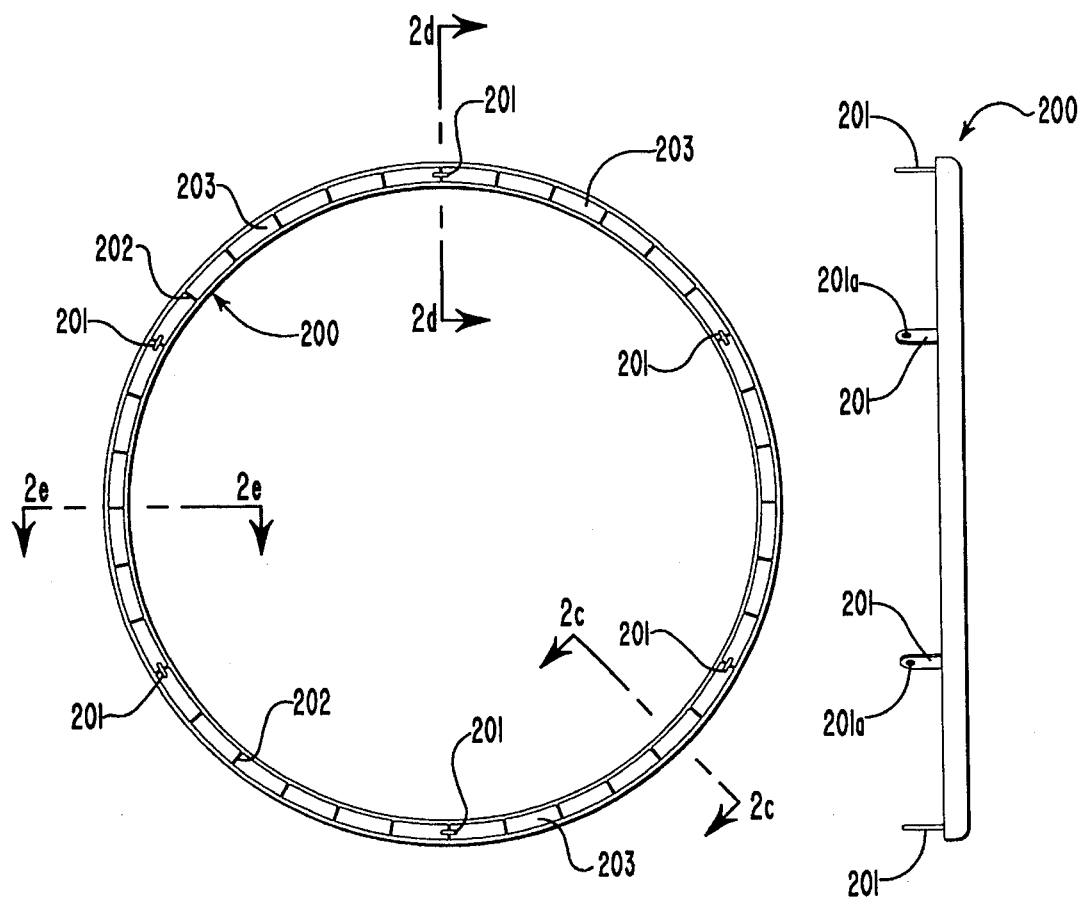
FIG. 2a
FIG. 2b
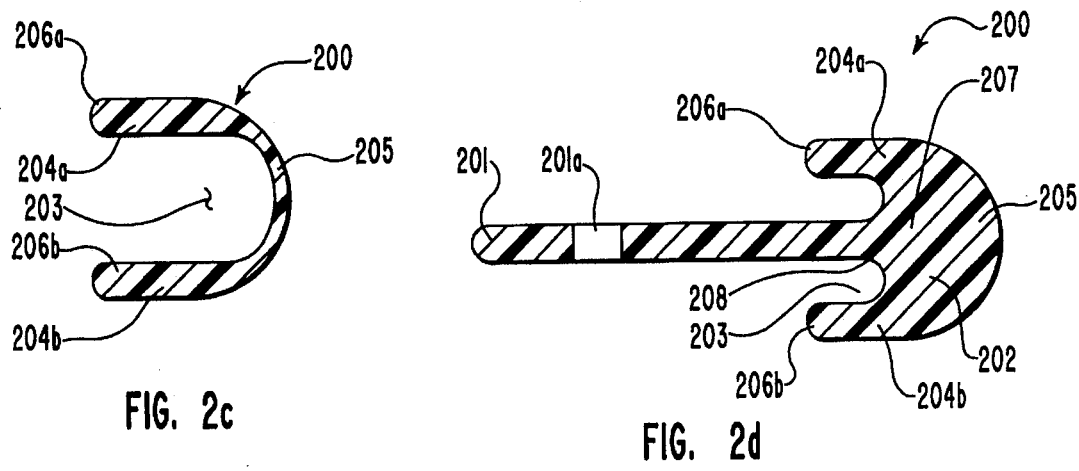
FIG. 2c
FIG. 2d

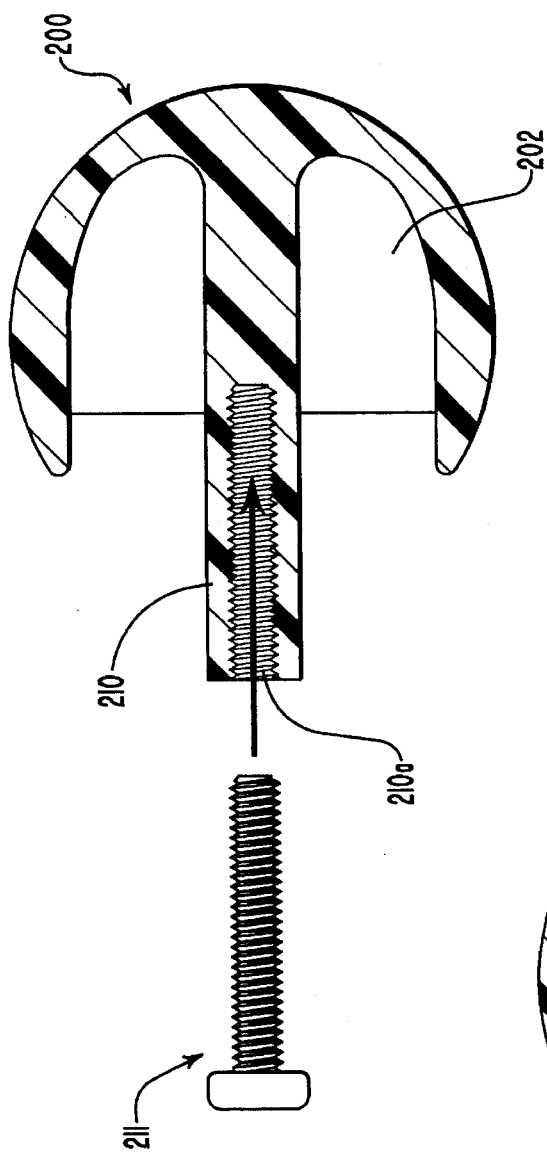
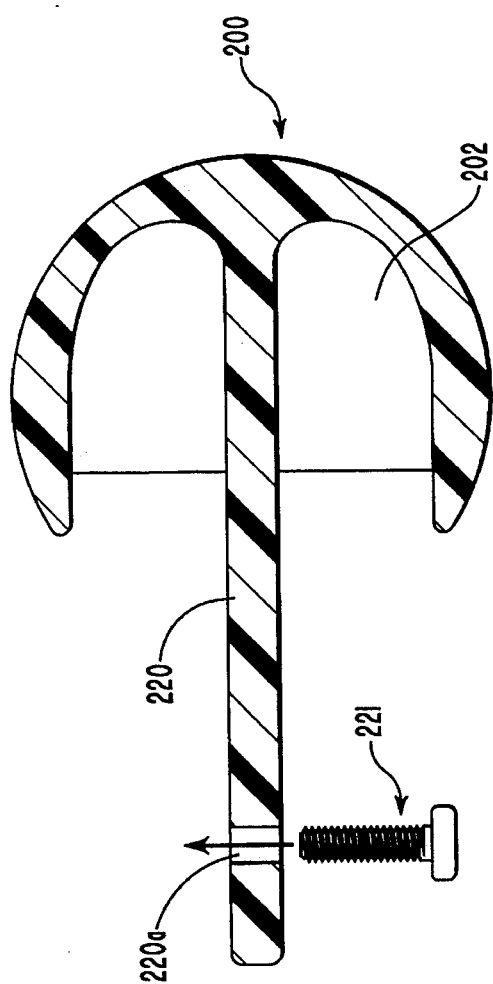
FIG. 2f
FIG. 2g

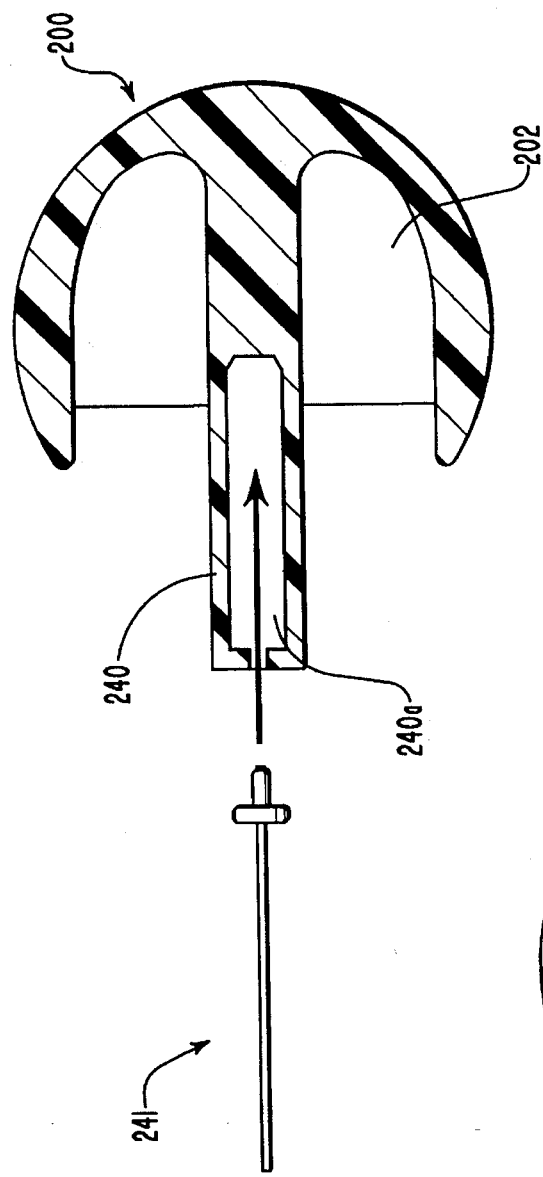
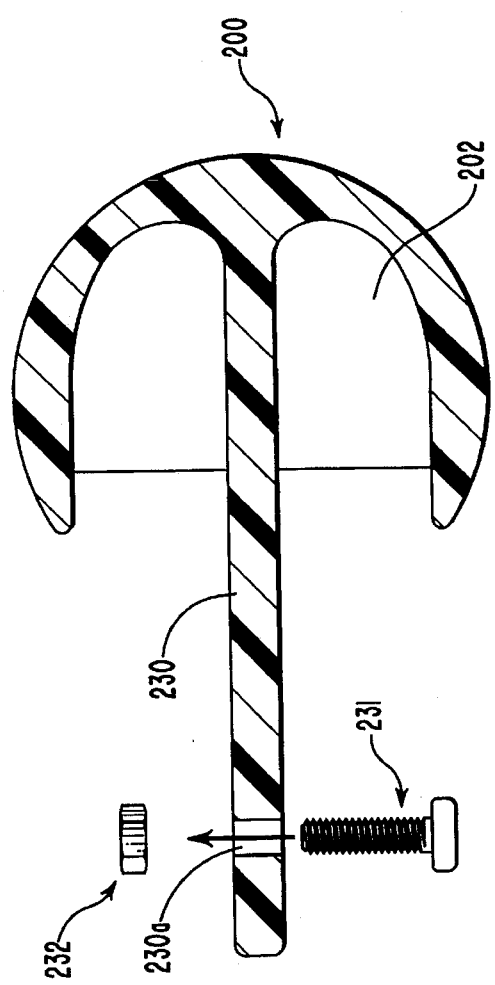
FIG. 2i
FIG. 2h

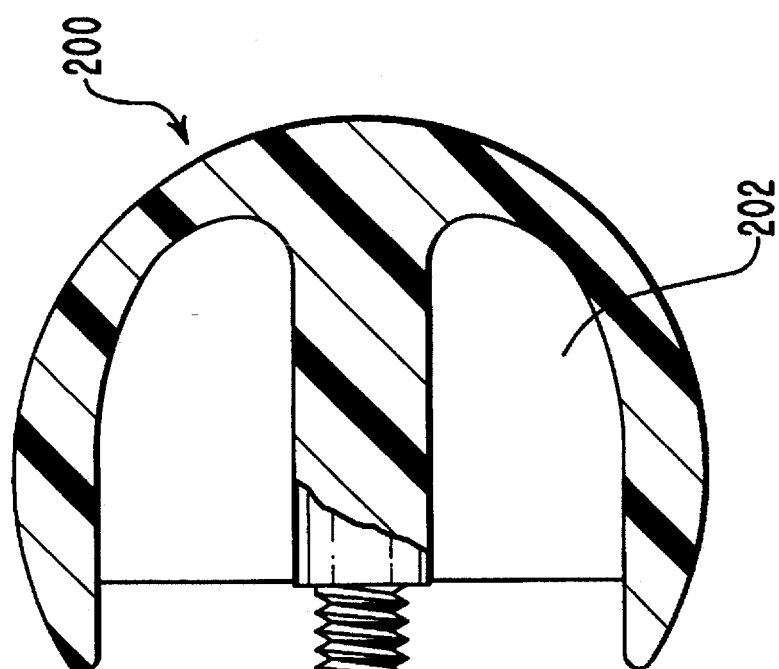
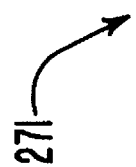
FIG. 21

LIGHT-WEIGHT WHEEL ASSEMBLY FOR WHEELCHAIRS

This is a continuation-in-part application of U.S. patent application Ser. No. 08/094,718, now U.S. Patent No. 5,379,866.

I. BACKGROUND OF THE INVENTION

A. Field of the Invention

This invention relates to the field of wheels and push rings for wheelchairs. More particularly, this invention relates to a lightweight wheelchair including an injection-moldable fiber-reinforced plastic push rim

B. The Background Art

Typical prior art rear wheelchair wheels typically include a steel rim, a steel push ring, a steel hub, steel spokes, a rubber tire and tube, and a lever positionable against the tire to serve as a brake. Prior art wheelchair wheel assembles typically weigh 12 to 14 pounds per pair. Because users of wheelchairs frequently suffer from a weakened physical condition, this weight can be a great burden to both the user of the wheelchair and to other persons pushing or lifting the wheelchair. As a result, wheel assemblies have become a target for those interested in designing a lighter wheelchair. Aluminum alloy wheels including an aluminum push ring, an aluminum rim, an aluminum hub, steel spokes, a rubber tire and tube and brass nipples are the preferred light weight prior art wheel chair wheel assembly, usually weighing 7½ to 9 pounds per pair. The wheelchair wheel assembly of the-present invention weighs only 5.5 pounds per pair, a 61% reduction in weight over prior art steel wheels assemblies and a 39% reduction in weight over aluminum alloy wheel assemblies. This weight reduction can result in substantial gains in mobility for the wheelchair user, not only in the use of the wheelchair, but also in lifting the wheelchair to place it into an automobile.

Another problem with prior art wheelchair wheel assemblies is that they transmit most vibrations and shock from the ground over which the wheelchair is travelling to the wheelchair rider, doing little to absorb such shock or vibration, particularly if a solid rather than a pneumatic tire is used. Vibrations and shocks are transmitted from the ground through the wheelchair wheel assembly and into the wheelchair frame jostling, shaking, vibrating and bouncing the rider in the wheelchair. Users of wheelchairs often suffer from pre-existing spinal injuries, pressure sores, skin abrasions, and other maladies and discomforts, as well as being generally injury-prone, and cannot tolerate the additional trauma of riding in a wheelchair that provides a bumpy, vibrating ride. The trauma of such a ride can aggravate existing conditions and cause further injury. The wheelchair wheels of this invention reduce the transmission of vibrations and shocks through a dampening action inherent in some materials such as fiber-reinforced plastic or composite materials.

II. SUMMARY OF THE INVENTION

It is an object of the invention to provide a wheel assembly for wheelchairs that is substantially lighter than typical prior art wheelchair wheel assemblies. This is accomplished by use of injection-moldable fiber-reinforced plastic materials in fabrication of portions of the wheel assembly, including the push ring and spokes.

It is an object of the invention to provide a wheelchair wheel assembly that absorbs shock and vibration generated as a wheelchair moves across uneven surfaces. The composite materials used to fabricate the wheel assembly of the invention have inherent shock-reduction and vibration-absorbing qualities that reduce transmission of vibration and bumpiness of an uneven road surface to the wheelchair user.

It is a further object of the invention to provide a wheelchair push ring of light-weight, fiber-reinforced plastic materials which may be connected to a wheelchair using a variety of fastening apparatuses.

III. BRIEF DESCRIPTION OF THE DRAWINGS

FIG. 2a depicts an elevation view of the wheelchair side of one preferred embodiment of the push ring used in the invention.

FIG. 2b depicts a side view of one preferred embodiment of the push ring used in the invention.

FIG. 2c depicts a sectional view of the push ring showing its general shape in cross section.

FIG. 2d depicts a sectional view of one preferred embodiment of a push ring showing its general shape at the intersection of a stiffener rib and a fastening apparatus comprising an attachment tab.

FIG. 2f depicts a sectional view of another preferred embodiment of a push ring having an fastening apparatus comprising a stem with a longitudinally threaded mounting hole and a screw.

FIG. 2g depicts a sectional view of another preferred embodiment of a push ring having a fastening apparatus comprising a stem with a transversely threaded mounting hole and a screw.

FIG. 2h depicts a sectional view of another preferred embodiment of a push ring having a fastening apparatus comprising a stem with a transverse mounting hole for receiving a screw and nut.

FIG. 2i depicts a sectional view of another preferred embodiment of a push ring having a fastening apparatus comprising a stem with a longitudinal mounting hole for receiving a rivet.

FIG. 2l depicts a sectional view of another preferred embodiment of a push ring having a fastening apparatus comprising a stud having an longitudinal, externally threaded section for receiving a nut.

IV. DESCRIPTION OF THE PREFERRED EMBODIMENTS

Figure 1:
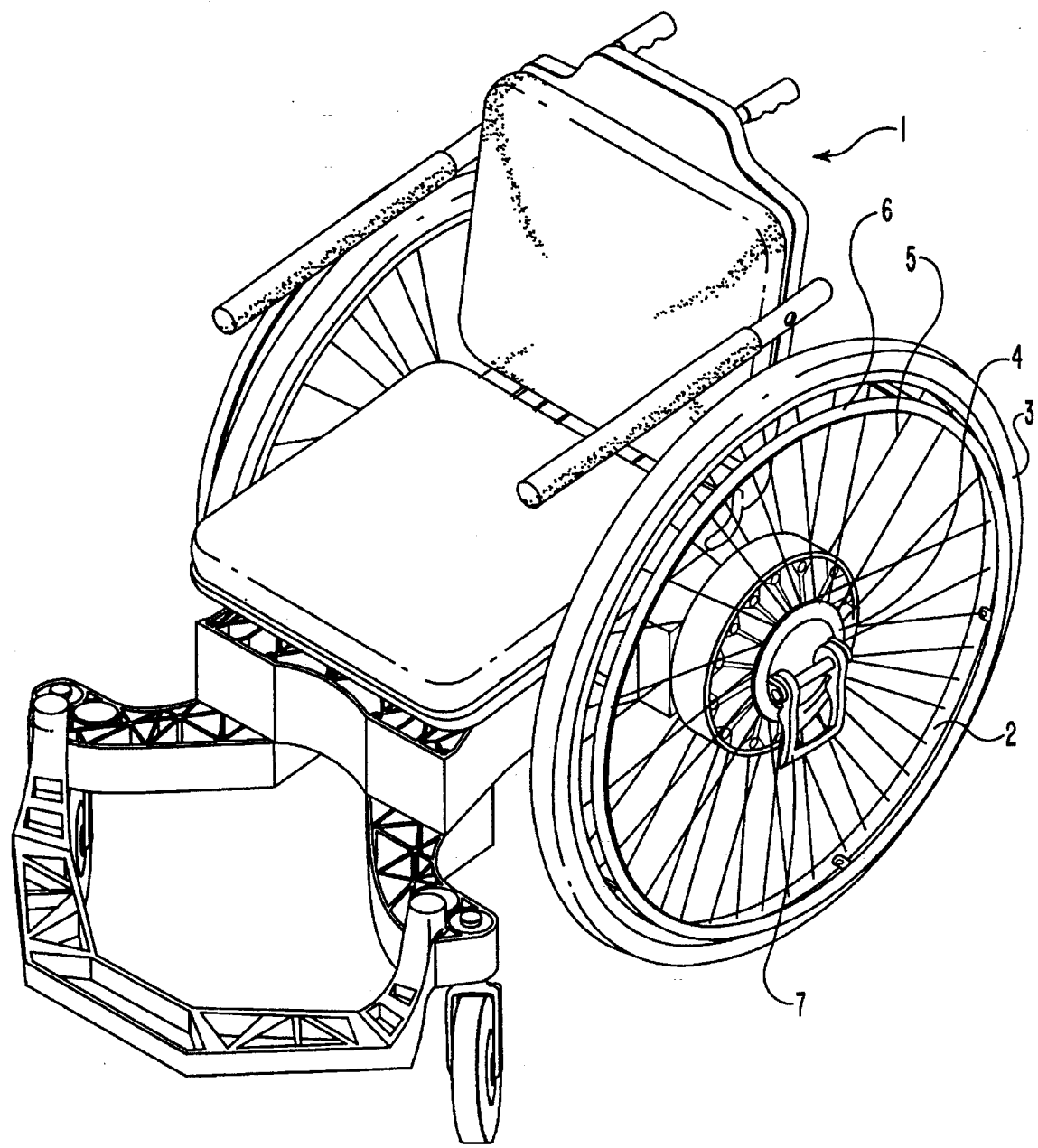
FIG. 1 depicts a perspective view of the wheelchair wheel assembly of one preferred embodiment of the invention in use on a wheelchair.

Referring to FIG. 1, one preferred embodiment of the c-shaped push ring is shown in use in a wheelchair. A wheelchair 1 is shown using a standard bicycle rim 2 and bicycle tire 3. The rim 2 is connected to hub 4 by a plurality of spokes 5 made from composite materials. A c-shaped push ring 6 of the invention is mounted to the rim 2 to allow the wheelchair user to propel himself. Integral to the interior of the hub 4 is an in-hub static brake of the invention. The brake has an engagement lever 7 conveniently located for manipulation by the wheelchair user.

FIG. 2a depicts an elevation view of the wheelchair side of the push ring 200. The push ring 200 is generally circular in shape and includes a plurality of fastening apparatuses 201 and a plurality of stiffener ribs 202. Between stiffener ribs 202 are hollow voids 203. In the preferred embodiment of the invention, six (6) fastening apparatuses are included on the push ring 200 spaced 60 degrees apart, and thirty-six (36) stiffener ribs 202 are included on the push ring 200 spaced 10 degrees apart. The preferred inside diameter of the push ring 200 is 20.65 inches and the preferred outside diameter is 20.919 inches. The dimensions listed herein as well as the number, spacing and type of fastening apparatuses 201 and the number, spacing and existence of stiffener ribs 202 may be varied widely in other embodiments of the invention.

Each fastening apparatus 201 may include, but is not limited to, a threaded stem and bolt assembly, a screw and nut, a stud and nut assembly, a rivet and rivet receiving device, a compression fitting, and an attachment tab. Each fastening apparatus may provide for a longitudinal or transverse attachment to the push ring.

FIG. 2b depicts a side view of one preferred embodiment of a push ring 200 including fastening apparatus 201 with transverse mounting holes 201a. FIG. 2c depicts a sectional view of the push ring. The push ring 200 includes a body portion 205 that is semi-circular and relatively thin at its midsection, but becomes thicker on its generally straight protruding sides 204a and 204b and terminates at rounded ends 206a and 206b, forming a c-shaped cross-section with a void or gap 203 at the interior of the c-shape between sides 204a and 204b. The approximate width of gap 203 is 0,485 inches.

FIG. 2d depicts another sectional view of the push ring 200, showing the general shape of the push ring 200 at the cross-sections of a stiffener rib 202 and a fastening apparatus comprising an attachment tab 201. The attachment tab 201 is shown protruding from the push ring 200 and includes a transverse mounting hole 201a. Sides 204a and 204b extending from body 205 and ends 206a and 206b are shown. Gap 203 is substantially smaller than in FIG. 2c due to the presence of the stiffener rib 202 between sides 204a and 204b in the center 207 of the c-shape of the push ring. The attachment tab 201 joins the side 204a with a curved shape 208 near the center 207. The approximate distance between sides 204a and 204b is 0.485 inches and the approximate distance from the far point of the body 205 to the start of curved shape 208 is 0.45 inches.

One preferred embodiment of an attachment tab is approximately 0.135 inches thick, 0.50 inches wide, protruding approximately 1.40 inches from push ring 200, and including a transversely located mounting hole 201a.

Figure 2E:
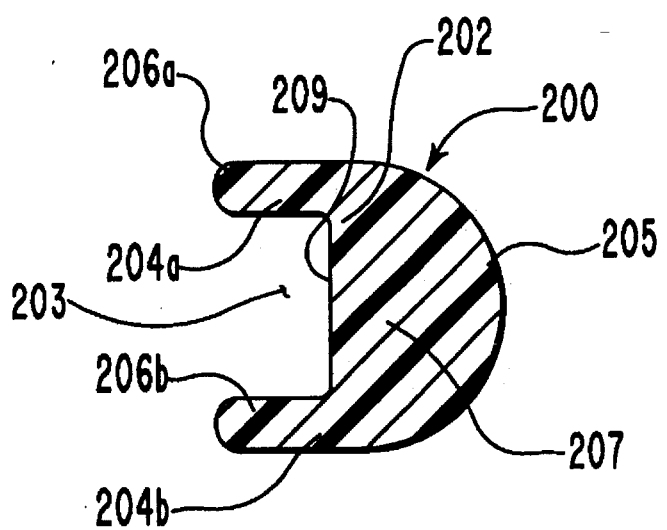
FIG. 2e depicts another sectional view of the push ring showing its general shape at a stiffener rib.

FIG. 2e depicts another sectional view of the push ring 200 showing the general shape of the push ring 200 at a stiffener rib 202. Body 205 is shown extending into sides 204a and 204b and ends 206a and 206b. The rib 202 extends across center 207 resulting in a flat edge 209 and small gap 203. The approximate distance between sides 204a and 204b is 0,485 inches and the approximate distance between edge 209 and the far point of the body 205 is 0.45 inches.

FIG. 2f depicts a sectional view of another preferred embodiment of push ring 200 showing the general shape of the push ring 200 at the cross-sections of a stiffener rib 202 and a fastening apparatus comprising a stem 210 with a longitudinally threaded mounting hole 210a. The stem 210 is shown protruding from the push ring 200, and threaded mounting hole 210a may receive a screw 211.

FIG. 2g depicts a sectional view of another preferred embodiment of push ring 200, showing the general shape of the push ring 200 at the cross-sections of a stiffener rib 202 and a fastening apparatus comprising a stem 220. The stem 220 is shown protruding from the push ring 200 and includes a transverse, threaded mounting hole 220a for receiving a screw 221 or other threaded device.

FIG. 2h depicts a sectional view of another preferred embodiment of push ring 200, showing the general shape of the push ring 200 at the cross-sections of a stiffener rib 202 and a fastening apparatus comprising a stem 230. The stem 230 is shown protruding from the push ring 200 and includes a transverse, unthreaded mounting hole 230a for receiving a screw 231 and nut 232.

FIG. 2i depicts a sectional view of another preferred embodiment of push ring 200, showing the general shape of the push ring 200 at the cross-sections of a stiffener rib 202 and a fastening apparatus comprising a stem 240. The stem 240 is shown protruding from the push ring 200 and includes a longitudinal mounting hole 240a for receiving a rivet 241.

Figure 2J:
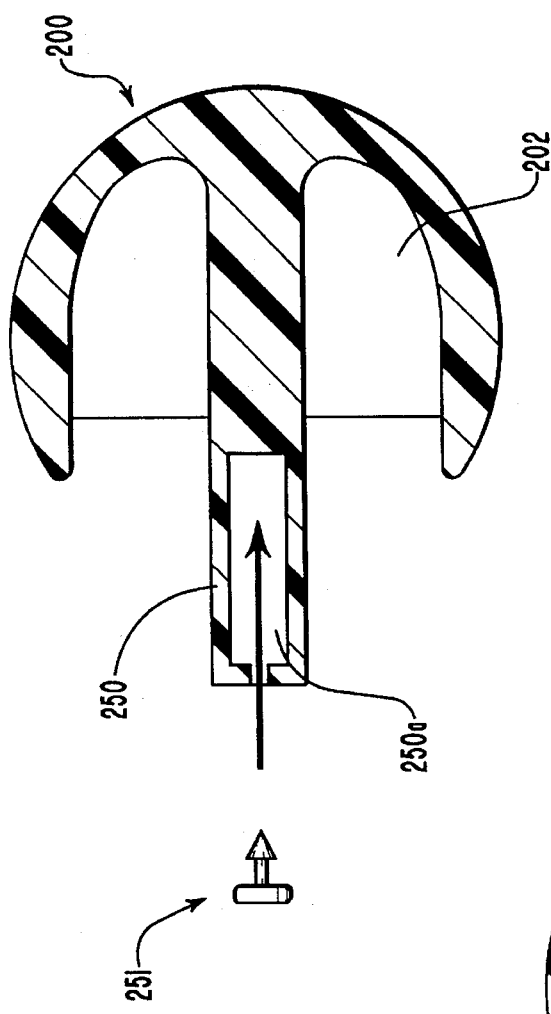
FIG. 2j depicts a sectional view of another preferred embodiment of a push ring having a fastening apparatus comprising a stem having a longitudinal mounting hole for receiving a compression fitting.

FIG. 2j depicts a sectional view of another preferred embodiment of push ring 200, showing the general shape of the push ring 200 at the cross-sections of a stiffener rib 202 and a fastening apparatus comprising a stem 250. The stem 250 is shown protruding from the push ring 200 and includes a longitudinal mounting hole 250a for receiving a compression fitting 251.

Figure 2K:
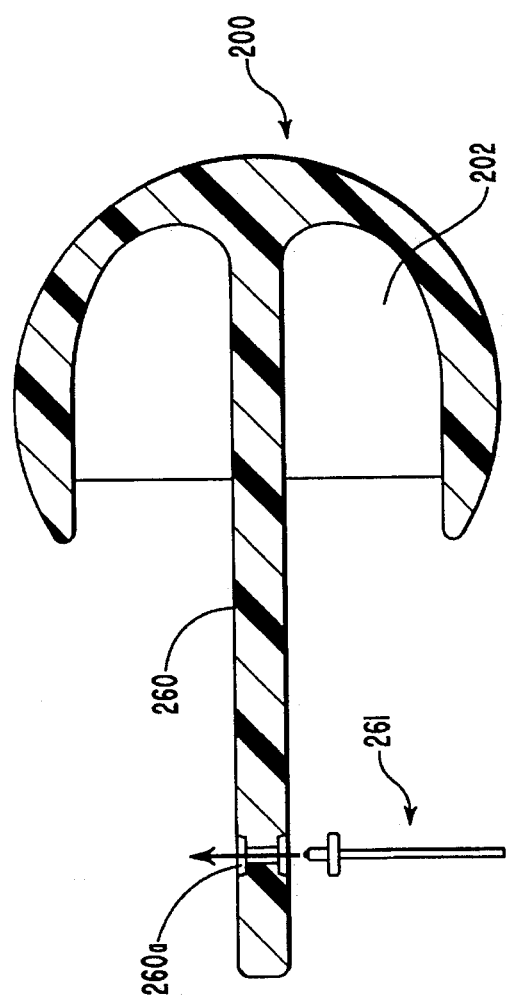
FIG. 2k depicts a sectional view of another preferred embodiment of a push ring having a fastening apparatus comprising a stem having a transverse mounting hole for receiving a rivet.

FIG. 2k depicts a sectional view of another preferred embodiment of push ring 200, showing the general shape of the push ring 200 at the cross-sections of a stiffener rib 202 and a fastening apparatus comprising a stem 260. The stem 260 is shown protruding from the push ring 200 and includes a transverse, frusto-conical mounting hole 260a for receiving a rivet 261.

FIG. 21 depicts a sectional view of another preferred embodiment of push ring 200, showing the general shape of the push ring 200 at the cross-sections of a stiffener rib 202 and a fastening apparatus comprising a threaded stem 270. The threaded stem 270 is shown protruding from the push ring 200 and may receive a nut 271.

The preferred embodiment of the fastening apparatus may comprise any shape that will securely attach the push ring to the wheelchair. For example, a longitudinally or transversely threaded fastening apparatus may receive any known form of threaded fastening device such as screw or other threaded device. The head of a fastening apparatus may be any desired shape such as circular, square, frusto-conical, or polygonal. Optionally, the fastening apparatus may include a washer, lock washer, a cotter pin or other device to aid in securing the push ring to the wheel chair.

A mounting hole in a stem or tab may be threaded to receive a screw or other threaded device. The mounting hole may also be unthreaded and have substantially parallel sides or a frusto-conical shape, and may receive a rivet, compression fitting, a screw and nut combination, or other fastening apparatus.

In the preferred embodiment, the push ring is made from injection molded discontinuous fiber reinforced thermoplastic, or any other fiber-reinforced plastic (FRP) or other composite or other moldable structural materials. The c-shaped or open ended cross-sectional design of the invention accommodates fabrication by injection molding because two split mold halves can be brought together to mold the push ring without leaving any undesirable solid or heavy sections of molded material. Because the push ring is made from FRP in the preferred embodiment, it weighs much less than a metal push ring due to a lower density of material. Prior art push rings are made from hollow steel, aluminum, or titanium tubular rings with circular cross-sections. In the preferred embodiment, the material used to manufacture the push ring is thermoplastic (as opposed to thermoset plastic) filled with reinforcing fibers. Many materials suitable for injection molding are known in the art. In alternative embodiments of the invention, other materials could be used for manufacture of products embodying the invention. Thermoplastic without reinforcing fibers, injectable metals, injectable quick-setting fiber-reinforced thermoset plastics, or any other injectable, quickly solidifying structural material could be used in other embodiments of the invention, such as NYLON 6 and NYLON 6-6 (generically referred to as polyamides) available from DuPont, PPS (polyphenylene sulfide), high density polyethylene and polypropylene. The reinforcing material used in the preferred embodiment of the invention is graphite (carbon) fiber commonly available commercially. The preferred embodiment uses standard modulus moderate strength TORAY T-700 (generically referred to as graphite) and NYLON 6-6 thermoplastic. An equally suitable standard modulus standard strength fiber which could be used is HERCULES AS-4 (generically referred to as "graphite fiber"). Alternatively, intermediate modulus high strength graphite fibers such as TORAY M 30 and HERCULES IM-7 (generically referred to as "graphite fiber") may be used. Aramid fibers such as KEVLAR 49 and TWARON (generically referred to as "aramid fiber") as well as glass fibers such as E-glass and S2 glass (generically referred to as fiberglass) available from Dow-Corning may be used. The thermoset plastic used in the preferred embodiment of the invention is NYLON 6-6 (polyamide) available from DuPont. Alternatively, PPS (polyphenaline sulfide), PET (polyester teraphalate), ABS (acrylobutadiene styrene) or other structural thermoplastics could be used.

Various other preferred embodiments of the invention could use any other structural material, eliminate or modify the stiffener ribs, attach fastening apparatuses at locations other than those shown in the drawings or cross sectional shapes other than a c-shape. For example, a cross-sectional semicircle, V-shape, or an open sided polygon with any number of sides could be used. An open side in cross-section is key to the invention because it enables manufacturing by injection molding. The elongated sides 204a and 204b shown in the drawings provide additional surface area for gripping the push ring and slowing the speed of the chair, but are optional.

The push ring may be used to slow a wheelchair by the user applying hand pressure to the push ring. The push ring of the invention, being made of FRP, experiences less heat build-up during slowing because of the lower heat transfer coefficient of FRP. The push ring of the invention is also lighter than prior art push rings both because of its c-shape and the low specific gravity of FRP (i.e. lower than aluminum or steel). The invention also provides a greater gripping surface for use during pushing or slowing than typical prior art push rings. Finally, design of the push ring of the invention permits fastening apparatuses and reinforcing ribs to be integrally injection molded in the push ring. On metal push rings, fasteners must be welded on, resulting in increased manufacturing cost.

While the present invention has been described and illustrated in conjunction with a number of specific embodiments, those skilled in the art will appreciate that variations and modifications may be made without departing from the principles of the invention as herein illustrated, described and claimed.

The present invention may be embodied in other specific forms without departing from its spirit or essential characteristics. The described embodiments are to be considered in all respects as only illustrative, and not restrictive. The scope of the invention, is, therefore, indicated by the appended claims, rather than by the foregoing description. All changes which come within the meaning and range of equivalency of the claims are to be embraced within their scope.

What is claimed and desired to be secured by United States Letters Patent is:

1. A push ring for use in a wheelchair wheel assembly comprising:

a generally circular ring portion having a cross section comprising a body portion and two protruding side portions attached to said body portion to form a gap between said side portions, the cross section being at a 90 degree angle to a tangent at a point on said circular ring; and a plurality of fastening apparatuses for attaching said ring portion to a wheel of a wheelchair wheel assembly.

2. A push ring as recited in claim 1 wherein said ring portion is generally c-shaped in cross section.

3. A push ring as recited in claim 1 wherein said ring portion is generally v-shaped in cross section.

4. A push ring as recited in claim 1 wherein said ring portion is generally a semi-circle in cross-section.

5. A push ring as recited in claim 1 wherein said ring portion is an open-sided polygon in cross section.

6. A push ring as recited in claim 1 wherein said ring portion is made from a material having a low specific gravity.

7. A push ring as recited in claim 1 wherein said ring portion is made from thermoplastic.

8. A push ring as recited in claim 1 wherein said ring portion is made from composite material.

9. A push ring as recited in claim 1 wherein said ring portion is manufactured by injection molding.

10. A push ring as recited in claim 1 wherein said ring portion is made from materials comprising fiber-reinforced plastic.

11. A push ring as recited in claim 1 further comprising a plurality of stiffener ribs on said ring portion for providing structural stiffness to said ring portion.

12. A push ring as recited in claim 11 wherein more than 24 stiffener ribs are included on said ring portion spaced in generally even increments apart from each other.

13. A ring as recited in claim 1 wherein said plurality of fastening apparatuses are independently selected from the group consisting of screws and internally threaded stems, screws and nuts, studs and nuts, rivets, attachment tabs and compression fittings.

14. A ring as recited in claim 13 wherein said plurality of fastening apparatuses comprises attachment tabs.

15. A ring as recited in claim 13 wherein said plurality of fastening apparatuses comprises screws and internally threaded stems.

16. A ring as recited in claim 13 wherein said plurality of fastening apparatuses comprises screws and nuts.

17. A ring as recited in claim 13 wherein said plurality of fastening apparatuses comprises externally threaded studs and nuts.

18. A ring as recited in claim 13 wherein said plurality of fastening apparatuses comprises compression fittings.

19. A ring as recited in claim 13 wherein said plurality of fastening apparatuses comprises rivets.

20. A ring as recited in claim 1 wherein six (6) fastening apparatuses are included on said ring portion spaced 60 degrees apart from each other.

21. A push ring for use in a wheelchair wheel assembly comprising:

a generally circular ring portion having a cross section comprising a body portion and two protruding side portions attached to said body portion to form a gap between said side portions, the cross section being at a 90 degree angle to a tangent at a point on said circular ring, stiffener ribs on said ring portion for providing structural stiffness to said ring portion, and a plurality of fastening apparatuses for attaching said ring portion to a wheel of a wheelchair wheel assembly;

wherein said ring portion is made from injection-molded composite materials.

22. A ring as recited in claim 21, wherein said ring is about 20 inches in diameter.

23. A lightweight wheel assembly for use on a wheelchair comprising:

(a) a wheel rim, (b) a wheel hub, (c) a plurality of spokes for use in connecting said rim to said hub; and (d) a push ring comprising:

(i) a generally circular ring portion having a cross section comprising a body portion and two protruding side portions attached to said body portion to form a gap between said side portions, the cross section being at a 90 degree angle to a tangent at a point on said circular ring, and (ii) a plurality of fasten apparatuses for attaching said ring portion to said rim;

wherein said ring portion is made from injection-molded composite materials.

* * * * *